(12) United States Patent
Chang et al.

(10) Patent No.: US 7,068,843 B2
(45) Date of Patent: Jun. 27, 2006

(54) METHOD FOR EXTRACTING AND MATCHING GESTURE FEATURES OF IMAGE

(75) Inventors: Chin-Chen Chang, Hsinchu Hsien (TW); Yea-Shuan Huang, Hsinchu Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 737 days.

(21) Appl. No.: 10/207,904

(22) Filed: Jul. 31, 2002

(65) Prior Publication Data

US 2003/0185445 A1 Oct. 2, 2003

(30) Foreign Application Priority Data

Mar. 29, 2002 (TW) ................. 91106400 A

(51) Int. Cl.
*G06K 9/46* (2006.01)

(52) U.S. Cl. ..................................... 382/203
(58) Field of Classification Search ................. 382/203
See application file for complete search history.

(56) References Cited

U.S. PATENT DOCUMENTS 4,783,829 A * 11/1988 Miyakawa et al. ......... 382/199
6,128,003 A * 10/2000 Smith et al. ................ 345/157
6,215,890 B1 * 4/2001 Matsuo et al. .............. 382/103
6,256,033 B1 * 7/2001 Nguyen ...................... 715/863

OTHER PUBLICATIONS

Mokhtarian et al., "Robust and Efficient Shape Indexing through Curvature Scale Space", 1996, Dept. of Electrical Engineering University of Surrey, England.*
Leymarie et al., "Curvature Morphology", 1988, Center for Intelligent Machines, McGill University, Montreal, Canada.*
Bebis et al., "Recognition Using Curvature Scale Space and Artificial Neural Networks", Dept. of Computer Science, University of Nevada, Reno.*

* cited by examiner

*Primary Examiner*—Joseph Mancuso
*Assistant Examiner*—Jonathan Schaffer
(74) *Attorney, Agent, or Firm*—Bacon & Thomas, PLLC

(57) ABSTRACT

A method for extracting and matching gesture features of image is disclosed. An input gesture image is captured, and then a closed curve formed by a binary contour image of the gesture image is determined by preprocessing the gesture image. A curvature scale space (CSS) image of the gesture image is drawn based on the closed curve. Feature parameters of a plurality of sets of the gesture image are determined by extracting first plural peaks from the CSS image as basis points, and each feature parameter of the plurality of sets of the gesture image is compared with each feature parameter of a plurality of reference gesture shapes represented as a basis point of the maximal peak, thereby determining a gesture shape corresponding to the gesture image.

9 Claims, 8 Drawing Sheets

METHOD FOR EXTRACTING AND MATCHING GESTURE FEATURES OF IMAGE

BACKGROUND OF THE INVENTION

1. Field of the Invention

The present invention relates to the field of image recognition and, more particularly, to a method for extracting and matching gesture features of image by performing a curvature scale space (CSS) image operation.

2. Description of Related Art

In the field of gesture recognition, the vision-based static gesture recognition is made possible by recognizing posture or shape of a gesture image. Hence, techniques about extracting and matching gesture features (e.g., posture or shape) of image are critical with respect to image recognition.

Conventionally, two modes of description are employed to recognize gesture features of image. One is characterized by utilizing gesture region description to describe a region occupied by an object. Shape moment descriptors are utilized to calculate the shape moments at various stages for obtaining a quantitative shape feature description which is in turn used as description parameters irrespective of size, rotation angle, and movement of an object. For example, Zernike moment (ZM) or pseudo-Zernike moment (PZM) is used as shape feature vector. The other one is known as a gesture shape boundary description for describing a real contour of image. It is characterized by converting a contour coordinate into a frequency region by Fourier descriptors so as to extract Fourier coefficients as features. It also provides description parameters which are irrespective of size, rotation angle, and movement of an object. Alternatively, an orientation histogram is utilized to obtain all edge points of a contour in order to obtain an orientation as features by calculation.

However, the above conventional techniques are not reliable due to noise interference. For example, in the case of utilizing gesture region description to describe a region, the shape moment descriptors are suitable for gesture shape description while its result is not reliable due to noise interference in searching a shape centroid or shape center. Furthermore, in the case of gesture shape boundary description, although Fourier descriptors is suitable for the description of gesture contour, it is also susceptible to noise interference, and its result is related to the number of edge points of contour to be processed. Moreover, the orientation histogram utilized to obtain all edge points of a contour is sensitive to the rotation angle. Therefore, it is desirable to provide a novel method for extracting and matching gesture features of image to mitigate and/or obviate the aforementioned problems.

SUMMARY OF THE INVENTION

An object of the present invention is to provide a method for extracting and matching gesture features of image in which curvature scale space is utilized to describe a gesture contour of image for preventing image shape from being adversely affected by size, rotation angle, and movement of image, thereby providing a reliable feature description.

Another object of the present invention is to provide a method for extracting and matching gesture features of image for increasing an accuracy of gesture recognition.

To achieve the objects, the method for extracting and matching gesture features of image of the present invention comprises the steps of: capturing an input gesture image; determining a closed curve formed by a binary contour image of the gesture image by preprocessing the gesture image; drawing a curvature scale space (CSS) image of the gesture image based on the closed curve, calculating feature parameters of a plurality of sets of the gesture image by extracting first plural peaks from the CSS image as basis points, and comparing each feature parameter of the plurality of sets of the gesture image with each feature parameter of a plurality of reference gesture shapes represented as a basis point of the maximal peak for determining a gesture shape corresponding to the gesture image.

Other objects, advantages, and novel features of the invention will become more apparent from the detailed description when taken in conjunction with the accompanying drawings.

DETAILED DESCRIPTION OF THE PREFERRED EMBODIMENT

Figure 1:
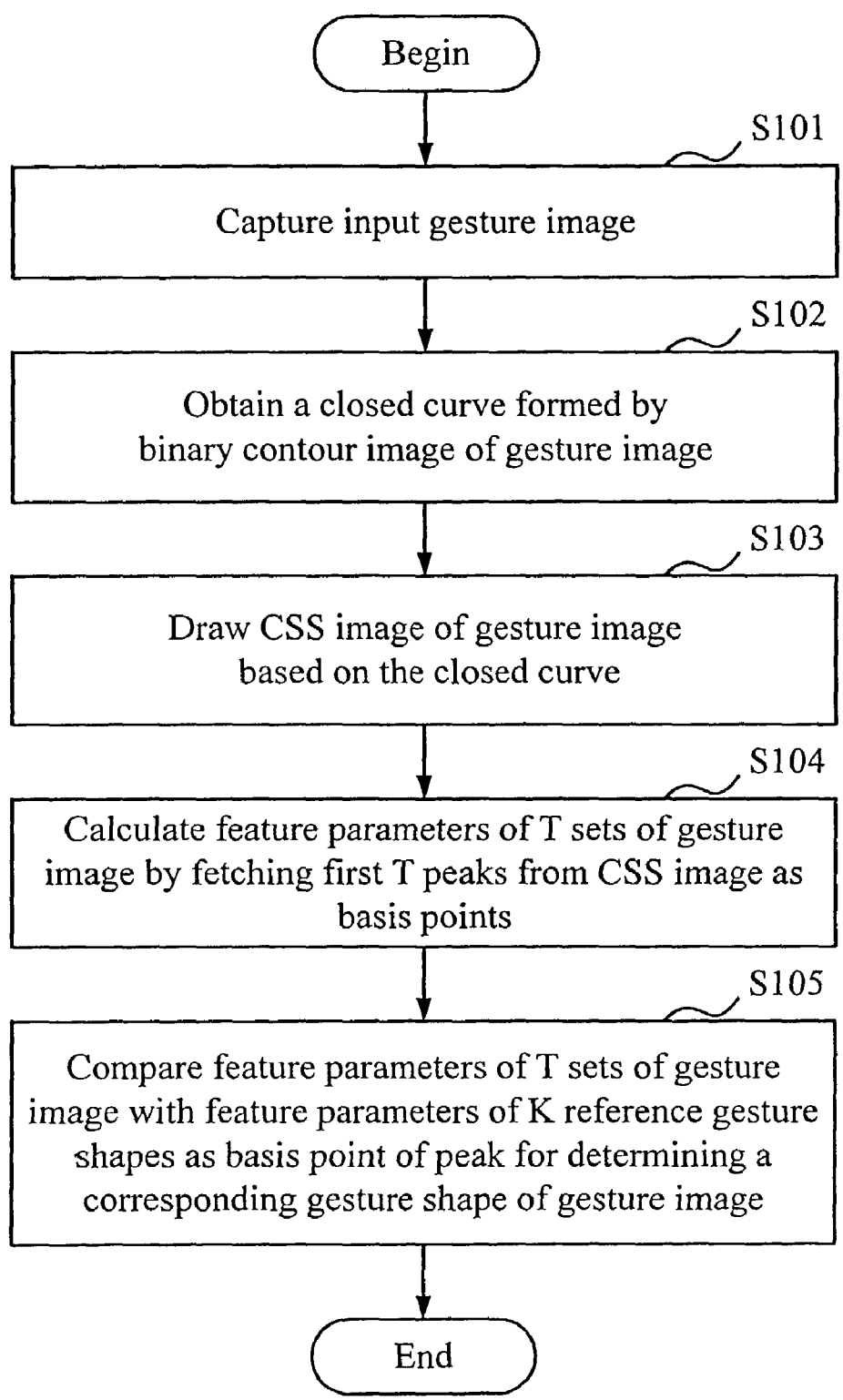
FIG. 1 is a flow chart illustrating a process of extracting and matching gesture features of image according to the invention.

With reference to FIG. 1, there is shown a preferred embodiment of process of extracting and matching gesture features of image in accordance with the present invention. At first, there is captured an input gesture image (step S101). Because a gesture feature is recognized based on a contour of gesture image in the present invention, the next step is to obtain a closed curve formed by binary contour image of the input gesture image by dividing the input gesture image by means of image preprocessing technique (step S102). The technique of calculating binary contour image is well known, and thus a detailed description is deemed unnecessary.

The process further comprises enabling an image processing device to draw a curvature scale space (CSS) image of gesture contour image based on the closed curve (step S103). Then, there are calculated feature parameters $F^I$ of T sets of input gesture image by extracting first T peaks from CSS image for use as basis points (step S104). In this embodiment, the peak is a local maximum larger than a critical value which is decided by image processing device. It is known that gesture shape is not smooth, i.e., there are projections like finger tips and depression-like areas between thumb and index finger. Further, a high degree of depression implies a large peak of CSS image. Thus, a peak larger than the critical value represents a recessed portion of the gesture while a peak smaller than the critical value can be viewed as interference which is omitted accordingly.

For the purpose of recognizing a gesture feature represented by feature parameter $F^I$, there is provided a database including K reference gesture shapes in which a feature parameter $F_{C_k^S}$ is represented as a basis point of maximal peak, where $1 \leq k \leq K$, for being compared with the feature parameter $F^I$. In general, a static gesture can be used to represent a certain digit. For example, the index finger represents digit "1", the index finger plus middle finger represent digit "2", the five fingers of a hand represent digit "5", and so on. In this embodiment, the database contains various shapes of reference gesture, including different sizes, movements, and rotation angles of gesture, for representing different digits. In addition, the database may contain other various shapes of static gesture such as sign language gesture.

The process further comprises a final step of comparing each feature parameter $F^I$ of T sets of gesture image with each feature parameter $F_{C_k^S}$ selected from K reference gesture shapes represented as a basis point of maximal peak, where $1 \leq k \leq K$. In the T×K results, a nearest neighbor algorithm is employed to recognize gesture for finding a nearest reference gesture shape with respect to input gesture image so as to determine a gesture shape corresponding to the input gesture image (step S105).

Figure 2:
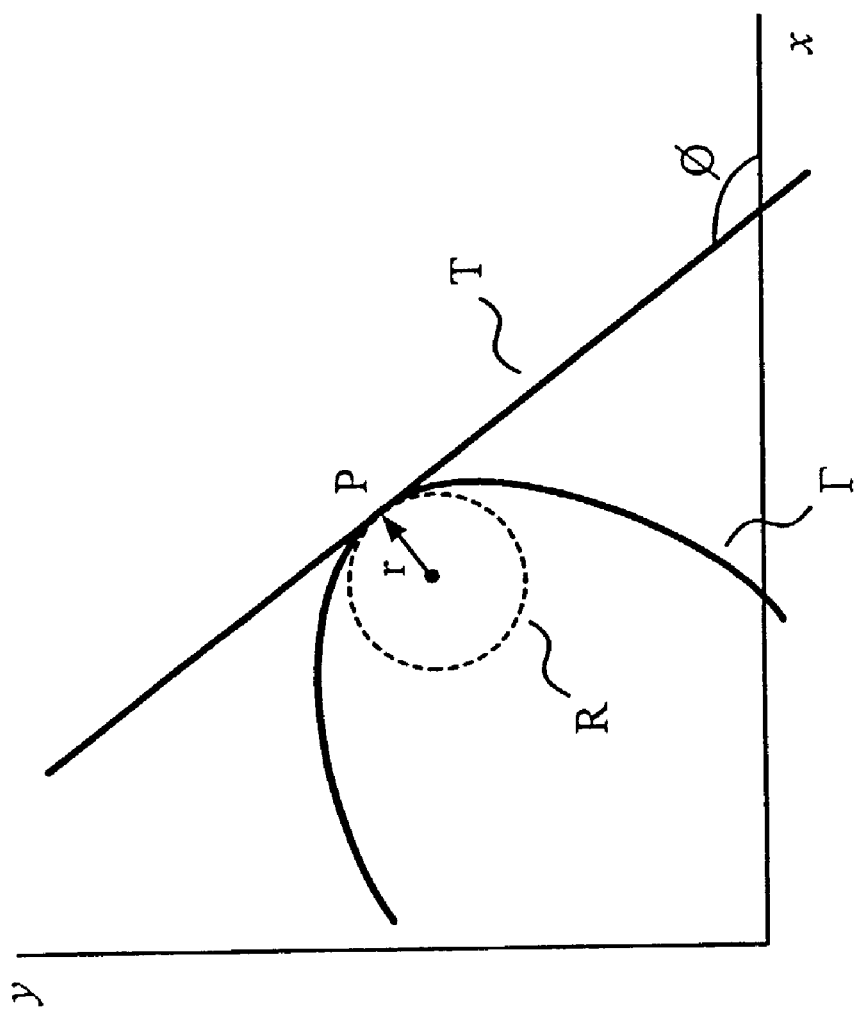
FIG. 2 schematically illustrating a circle of curvature according to the invention.
Figure 3:
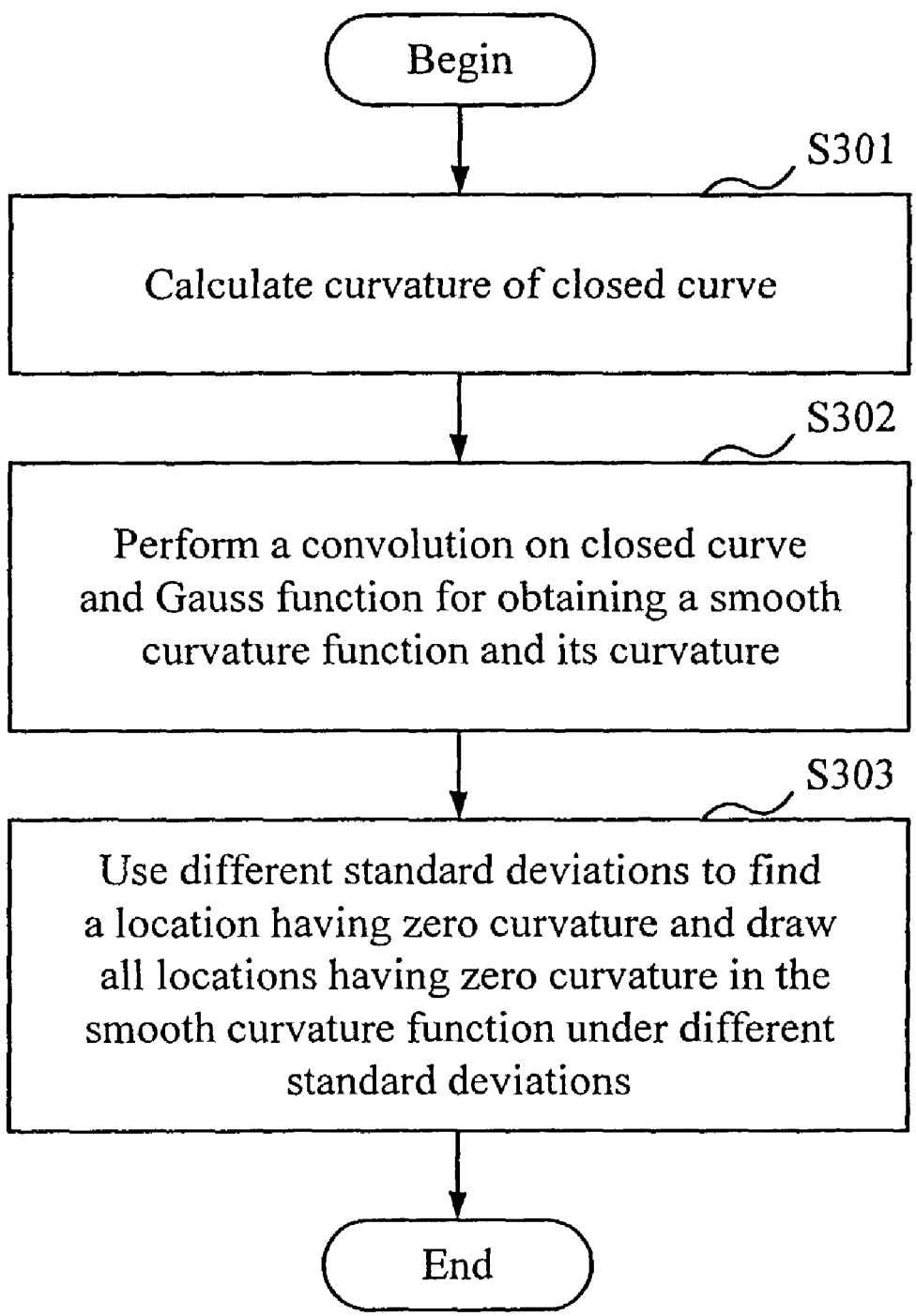
FIG. 3 is a flow chart illustrating a process of calculating curvature scale space image according to the invention.

With reference to FIG. 3 in conjunction with FIG. 2, the detailed process of the step S103 for calculating CSS image is illustrated. In FIG. 2, curvature κ at point P of closed curve Γ is defined as either gradient angle of tangent φ with respect to arc length parameter u on the instant of time or an inverse of radius r of circle of curvature R. Thus, curvature κ can be expressed in the following equation:

$$\kappa = \frac{d\phi}{du} = \frac{1}{r}.$$

Also, closed curve Γ can be expressed as $\{x(u), y(u)\}$ in terms of arc length parameter u in which u is normalized to have a value between 0 and 1. After rearrangement, above curvature κ of closed curve Γ can be expressed as follows:

$$\kappa(u) = \frac{\dot{x}(u)\ddot{y}(u) - \ddot{x}(u)\dot{y}(u)}{(\dot{x}^2(u) + \dot{y}^2(u))^{3/2}} \text{(step S301);}$$

where $\dot{x}(u) = \frac{dx}{du}$, $\ddot{x}(u) = \frac{d^2 x}{du^2}$, $\dot{y}(u) = \frac{dy}{du}$ and $\ddot{y}(u) = \frac{d^2 y}{du^2}$;

Next, a convolution operation is performed with respect to closed curve Γ and an one-dimensional Gauss function $g(u,\sigma)$ for obtaining a smooth curvature function $\Gamma_\sigma = \{X(u,\sigma), Y(u,\sigma)\}$ and its curvature $$\kappa(u, \sigma) = \frac{X_u(u, \sigma)Y_{uu}(u, \sigma) - X_{uu}(u, \sigma)Y_u(u, \sigma)}{(X_u(u, \sigma)^2 + Y_u(u, \sigma)^2)^{3/2}} \text{(step S302),}$$

where σ is standard deviation. The Gauss function can be expressed as follows:

$$g(u, \sigma) = \frac{1}{\sigma\sqrt{2\pi}} \exp\left(\frac{-u^2}{2\sigma^2}\right),$$

and $X(u,\sigma)$ and $Y(u,\sigma)$ in the smooth curvature function $\Gamma_\sigma$ can be expressed respectively as follows:

$$X(u, \sigma) = x(u) * g(u, \sigma) = \int_{-\infty}^{\infty} x(v) \cdot \frac{1}{\sigma\sqrt{2\pi}} \cdot \exp\left(\frac{-(u-v)^2}{2\sigma^2}\right) dv,$$

$$Y(u, \sigma) = y(u) * g(u, \sigma) = \int_{-\infty}^{\infty} y(v) \cdot \frac{1}{\sigma\sqrt{2\pi}} \cdot \exp\left(\frac{-(u-v)^2}{2\sigma^2}\right) dv.$$

Moreover, $X_u(u,\sigma)$, $X_{uu}(u,\sigma)$, $Y_u(u,\sigma)$ and $Y_{uu}(u,\sigma)$ of curvature κ(u,σ) are expressed respectively as follows:

$X_u(u,\sigma) = x(u) * g_u(u,\sigma)$, $X_{uu}(u,\sigma) = x(u) * g_{uu}(u,\sigma)$, $Y_u(u,\sigma) = y(u) * g_u(u,\sigma)$, $Y_{uu}(u,\sigma) = y(u) * g_{uu}(u,\sigma)$, where $g_u(u, \sigma) = \frac{\partial}{\partial u} g(u, \sigma)$ and $g_{uu}(u, \sigma) = \frac{\partial^2}{\partial u^2} g(u, \sigma)$.

Figure 4A:
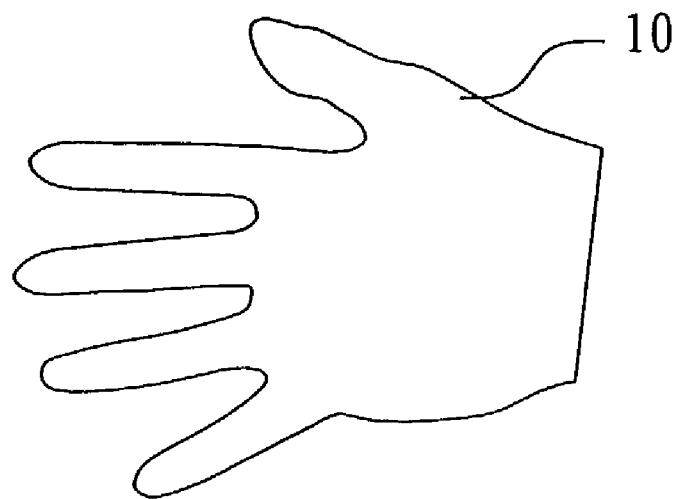
FIG. 4A and FIG. 4B are schematic drawings of binary contour image of first gesture and second gesture according to the invention respectively.
Figure 4B:
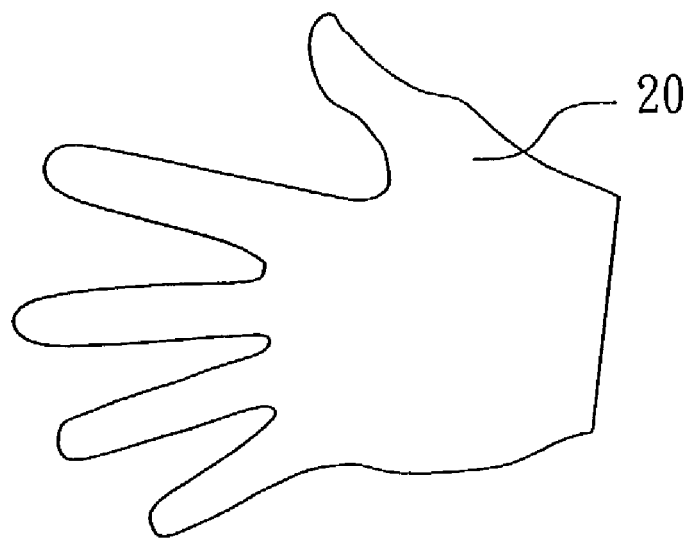
Figure 5A:
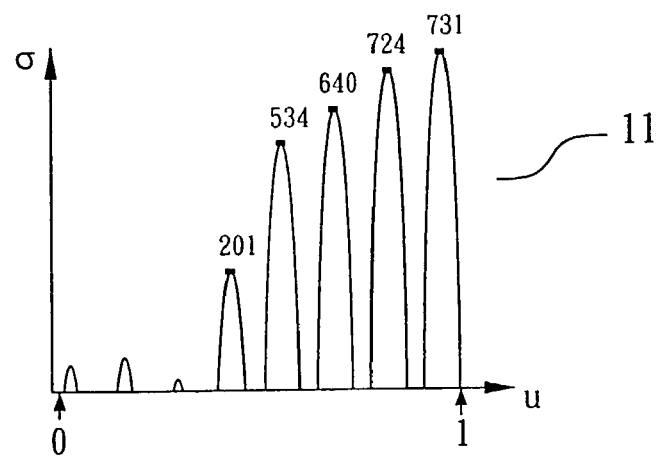
FIG. 5A and FIG. 5B are charts depicting curvature scale space images of FIGS. 4A and 4B respectively.
Figure 5B:
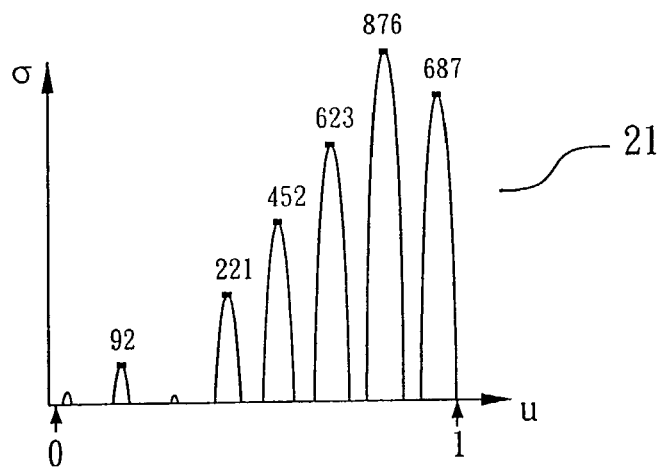

Generally, a smooth curve has a higher resolution when σ is relatively small while having a lower resolution when σ is relatively large. Hence, the contour drawn by $\Gamma_\sigma = \{X(u,\sigma), Y(u,\sigma)\}$ is more smooth as σ increases. Finally, different standard deviations σ are used to find a location having zero curvature in $\Gamma_\sigma = \{X(u,\sigma), Y(u,\sigma)\}$ and thus all locations having zero curvature are drawn under different standard deviations σ (S303). As a result, a CSS image of input gesture image contour is obtained. With reference to FIGS. 4A and 4B, there are shown schematic drawings of binary contour image of first gesture 10 and second gesture 20. Based on the above process, charts depicting first gesture 10 and second gesture 20 of CSS images shown in FIGS. 4A and 4B are determined as illustrated in FIGS. 5A and 5B respectively. In each of FIGS. 5A and 5B, indicated by numerals 11 and 21 respectively, axis of abscissa is u which is normalized to have a value between 0 and 1 and axis of ordinate is σ. In the u-σ coordinate, the position of κ(u,σ)=0 is defined as zero curvature point.

Figure 7:
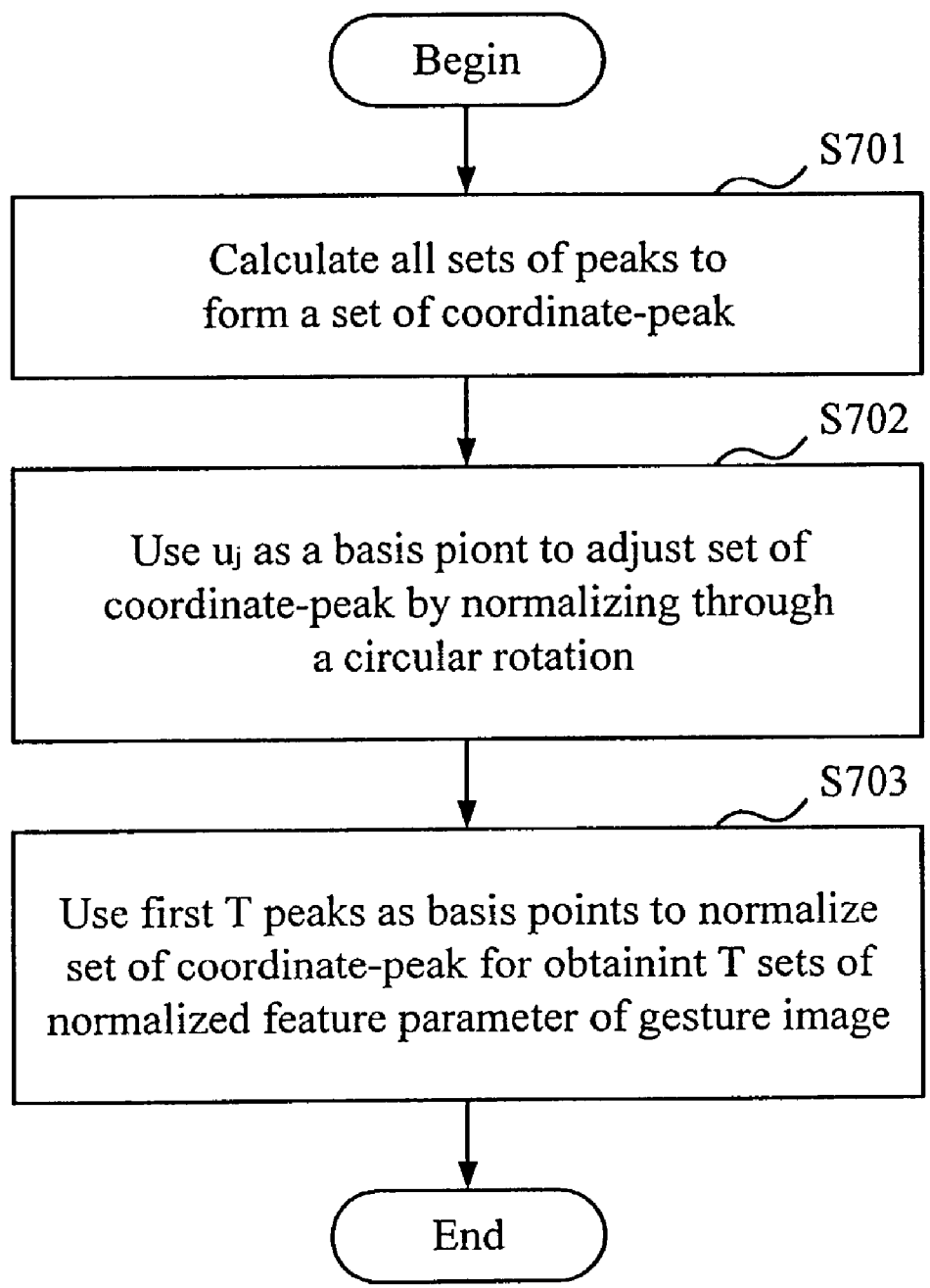
FIG. 7 is a flow chart illustrating a process of calculating feature parameter of gesture images according to the invention.

In response to the drawing of CSS image of input gesture image and an extraction of first T peaks as basis points, an extraction of T sets of normalized gesture feature parameter $F^I$ is performed in which each set of normalized gesture feature parameter $F^I$ is calculated based on a process illustrated in the flow chart of FIG. 7. First, all sets of peaks in CSS image are calculated to form a set of coordinate-peak (step S701), which is denoted as u-σ set, and expressed as $\{(u_i,\sigma_i)\}_{i=1,\ldots,N}^{Original} = \{(u_1,\sigma_1), (u_2,\sigma_2), \ldots, (u_j,\sigma_j), \ldots, (u_N,\sigma_N)\}$, where N is the number of all detected peaks in CSS image. In case that $u_1 < u_2 < \ldots < u_j < \ldots < u_N$, $u_j$ is the basis point. The u-σ set can be expressed as follows after being normalized through a circular rotation:

$\{(u_1,\sigma_1)\}_{i=1,\ldots,N}^{Normalized} = \{(0,\sigma_j), \ldots, (u_{j+1}-u_j, \sigma_{j+1}), \ldots, (1+u_1-u_j,\sigma_1), \ldots, (1+u_{j-1}-u_j,\sigma_{j-1})\}$ (step S702).

Figure 6:
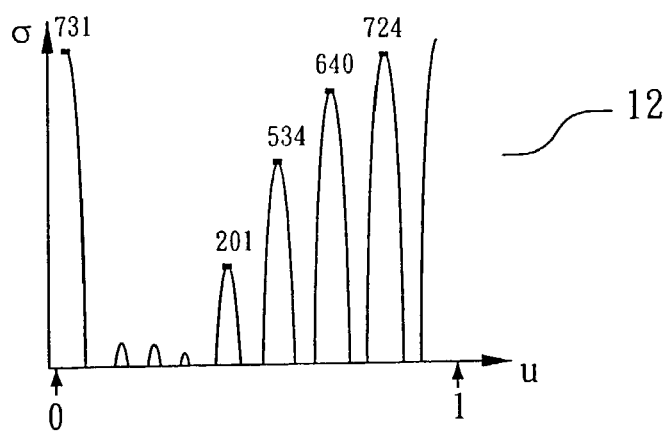
FIG. 6 is a chart depicting a normalized curvature scale space image of FIG. 5A.

With reference to FIGS. 5A and 6, the u-σ coordinate 11 in FIG. 5A represents one that a circular rotation has not been performed thereon, and the peak is 731. If $u_j$ is defined as peak in u-axis, a chart as shown un FIG. 6 is obtained by performing a circular rotation with respect to $u_j$ (i.e., basis point). That is, a normalized u-σ coordinate 12 is the one obtained by utilizing a corresponding coordinate of peak as basis point in which u=0 is the position that peak corresponds to u-axis.

The first several peaks have about equal values while exhibiting significant curvature changes in the CSS image of gesture shape due to rugged shape of static gesture in which peak may occur at each of three recessed portions between fingers except the thumb. As a result, an unstable state may occur. For example, in FIGS. 4A and 4B, peaks of u–σ coordinates 11 and 21 formed by CSS images occur at different recessed portions between fingers while the same gesture is shown. In FIG. 5A, peak occurs at the recessed portion between the thumb and index finger. In FIG. 5B, peak occurs at the recessed portion between the index and middle fingers. For the purpose of obtaining a stable state, it is required to select the first T peaks that are larger than a critical value. Then, the first T peaks are utilized to normalize u–σ coordinate based on their coordinate values. As a result, T sets of normalized feature parameter $F^I = \{\{(u_1^I, \sigma_1^I)\}_{I=1,\ldots,N}^{t-Normalized} | t=1, 2, \ldots, T\}$ are obtained, where I is the input gesture image (step S703).

After obtaining the feature parameter $F^I$ of the input gesture image, the step S105 as shown in FIG. 1 is performed again to compare $F^I$ with feature parameter $F_{C_k}^S$ of reference gesture shape which has a peak as basis point. As a result, a possible similarity between $F^I$ and $F_{C_k}^S$ is obtained to determine a corresponding gesture shape of input gesture image. The feature parameter $F_{C_k}^S$ of predetermined reference gesture shape represented as a basis point of the maximal peak in the database can be expressed as $F_{C_k}^S = \{\{(u_{j,C_k}^S, \sigma_{j,C_k}^S)\}_{j=1,\ldots,M}^{I-Normalized}\}$, where $1 \leq k \leq K$, K is the number of types of reference gesture shapes stored in the database, $C_k$ is a type represented by reference gesture shape, M is the number of peaks of reference gesture shape, and S is the reference gesture shape.

Figure 8:
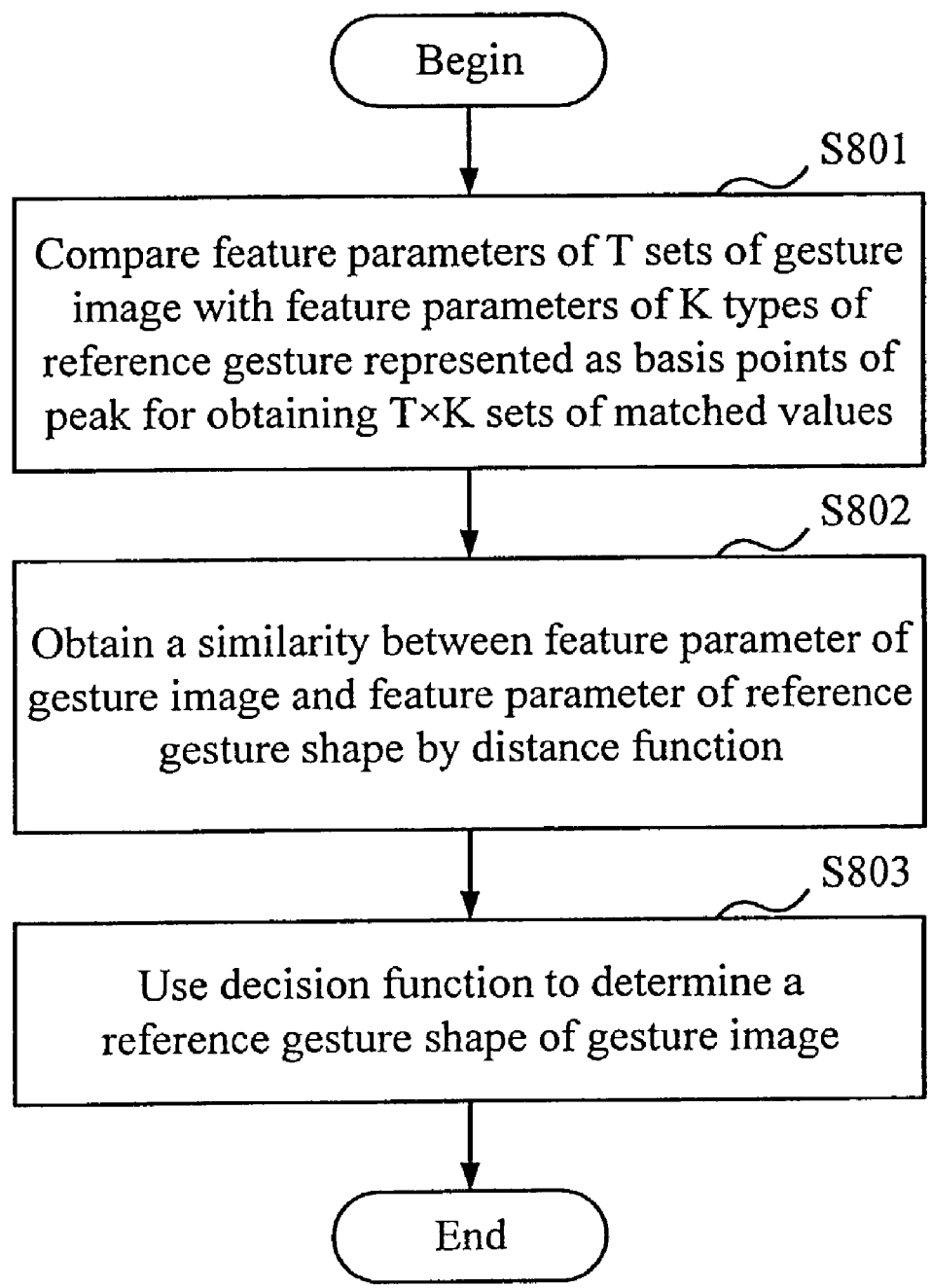
FIG. 8 is a flow chart illustrating a process of comparing feature parameter of input gesture image with feature parameter of predetermined reference gesture shape according to the invention.

With reference to FIG. 8, there is shown a flow chart illustrating a process of comparing $F^I$ and $F_{C_k}^S$. First, each feature parameter $F^I$ of T sets of gesture image is compared with each feature parameter $F_{C_k}^S$ of K reference gesture shapes, where $1 \leq k \leq K$, in order to obtain T×K sets of matched values $MATCH_{t1}$ (step S801), wherein $MATCH_{t1}$ is defined as a sum of distance of matched peaks and distance of unmatched peaks between two sets. Thus, $MATCH_{t1}$ can be expressed as follows:

$$MATCH_{t1} = \sum_{\substack{matched \\ peaks}} \sqrt{(u_i^I - u_{j,C_k}^S)^2 + (\sigma_i^I - \sigma_{j,C_k}^S)^2} + \sum_{\substack{unmatched \\ peaks}} \sigma_i^I + \sum_{\substack{unmatched \\ peaks}} \sigma_{j,C_k}^S.$$

A similarity between feature parameter of input gesture image and feature parameter of reference gesture shape is obtained by performing a distance function (step S802). The distance function can be expressed as: $dist(F^I, F_{C_k}^S) = \min\{MATCH_{t1}\}$, which indicates that a small distance refers to a high similarity of two shapes.

Finally, a decision function is utilized to determine a reference gesture shape of the input gesture image (step S803). Since a nearest neighbor algorithm is used as gesture recognition, the decision function can be expressed as follows:

$$D(F^I) = C_J \text{ if } dist(F^I, F_{C_J}^S) = \min_{1 \leq k \leq K}\{dist(F^I, F_{C_k}^S)\}.$$

Figure 9:
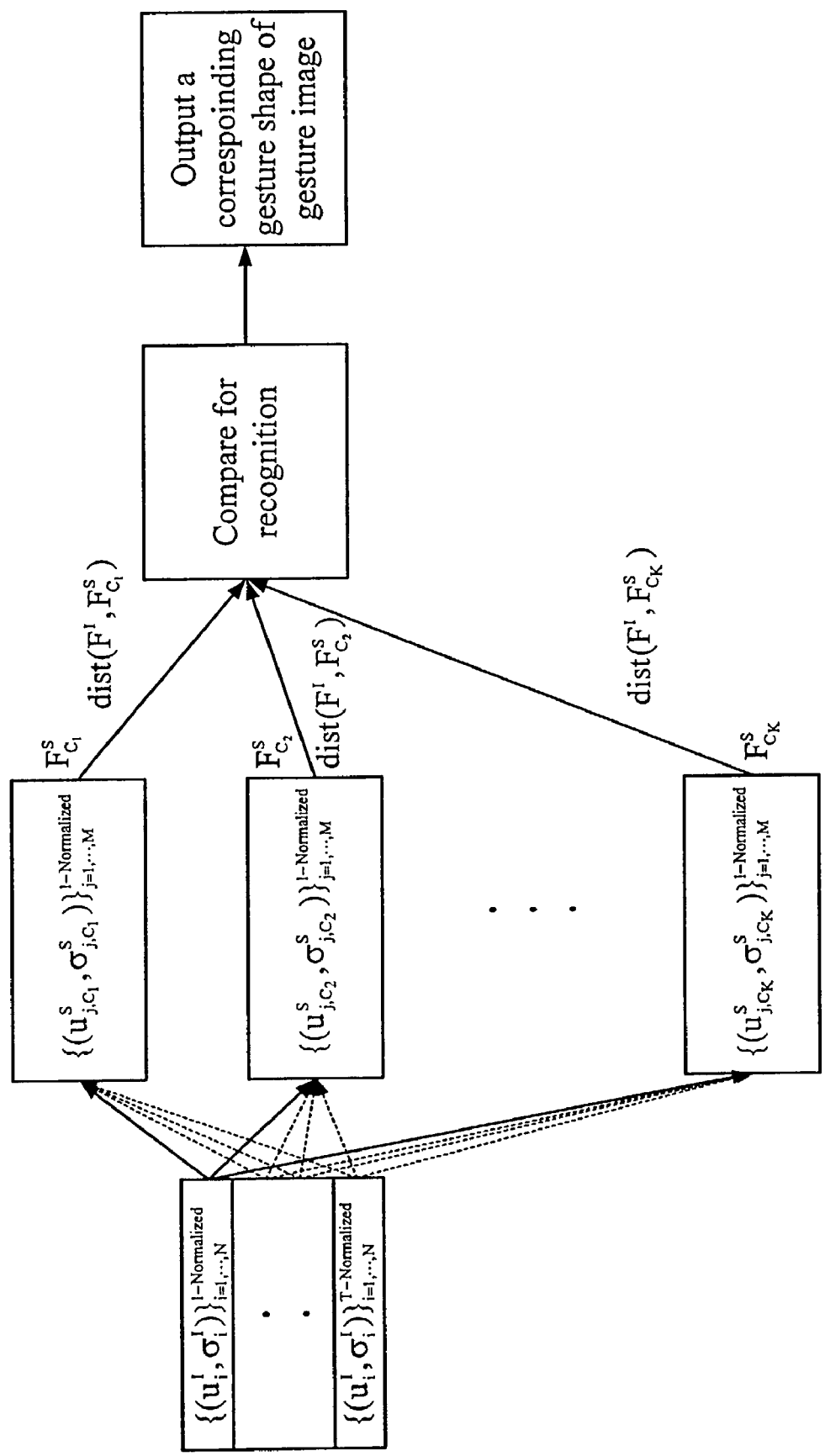
FIG. 9 schematically illustrates the comparison in the flow chart illustrated in FIG. 8.

The comparison in the flow chart illustrated in FIG. 8 can be schematically shown in FIG. 9. In conclusion, a real gesture shape of input gesture image can be obtained by a plurality of comparisons.

In view of the foregoing, it is known that the invention utilizes the CSS technique to draw a contour of gesture image, which can be applied in games, human computer interfaces, sign language recognition, video surveillance, image and video retrieval, etc. Particularly, the invention is suitable in game related applications which require features of gesture recognition, smooth manipulation, highly interaction between players and game, to greatly increase entertainment effect.

Although the present invention has been explained in relation to its preferred embodiment, it is to be understood that many other possible modifications and variations can be made without departing from the spirit and scope of the invention as hereinafter claimed.

What is claimed is:

1. A method for extracting and matching gesture features of an image, comprising the steps of:
   (A) capturing an input gesture image;
   (B) determining a closed curve formed by a binary contour image of the gesture image by preprocessing the gesture image;
   (C) drawing a curvature scale space (CSS) image of the gesture image based on the closed curve;
   (D) determining feature parameters of a plurality of sets of the gesture image by extracting first plural peaks from the CSS image as basis points, wherein each peak is a local maximum larger than a critical value and each feature parameter of the sets of the gesture image is obtained by performing the steps of:
      (D1) calculating all sets of the peaks in the CSS image to form a coordinate-peak set:

$$\{(u_i, \sigma_i)\}_{i=1,\ldots,N}^{Original} = \{(u_1, \sigma_1), (u_2, \sigma_2), \ldots, (u_j, \sigma_j), \ldots, (u_N, \sigma_N)\},$$

where N is the number of detected peaks in the CSS image;
      (D2) taking $u_j$ as a basis point to normalize the coordinate-peak set through a circular rotation as a normalized coordinate-peak set:

$$\{(u_i, \sigma_i)\}_{i=1,\ldots,N}^{Normalized} = \{(0, \sigma_j), \ldots, (u_{j+1} - u_j, \sigma_{j+1}), \ldots, (1 + u_1 - u_j, \sigma_j), \ldots, (1 + u_{j-1} - u_j, \sigma_{j-1})\}$$

where $u_1 < u_2 < \ldots < u_j < \ldots < u_N$ and $u_j$ is a u-axis coordinate having a maximal peak in the coordinate-peak set; and
      (D3) selecting first T largest peaks as basis points to normalize the coordinate-peak set for obtaining T sets of normalized feature parameter $F^I = \{\{(u_i^I, \sigma_i^I)\}_{i=1,\ldots,N}^{t-Normalized} | t=1, 2, \ldots, T\}$, where I is the input gesture image; and
   (E) comparing each feature parameter obtained in step (d) of the sets of the gesture image with each feature parameter of a plurality of reference gesture shapes for determining a gesture shape corresponding to the gesture image.

2. The method as claimed in claim 1, wherein in step (C), the CSS image is obtained by performing the steps of:
   (C1) determining a curvature $$\kappa(u) = \frac{\dot{x}(u)\ddot{y}(u) - \ddot{x}(u)\dot{y}(u)}{(\dot{x}^2(u) + \dot{y}^2(u))^{3/2}}$$

of a closed curve $\Gamma_o = \{x(u), y(u)\}$, where u is a normalized arc length parameter;

$$\ddot{x}(u) = \frac{d^2x}{du^2}, \dot{x}(u) = \frac{dx}{du}, \dot{x}(u) = \frac{dx}{du}, \text{ and } \ddot{y}(u) = \frac{d^2y}{du^2};$$

(C2) performing an operation with respect to the closed curve Γ and a Gauss function g(u,σ) to determine a smooth curvature function $\Gamma_\sigma = \{X(u,\sigma), Y(u,\sigma)\}$ and its curvature $$\kappa(u, \sigma) = \frac{X_u(u, \sigma)Y_{uu}(u, \sigma) - X_{uu}(u, \sigma)Y_u(u, \sigma)}{(X_u(u, \sigma)^2 + Y_u(u, \sigma)^2)^{3/2}},$$

where σ is standard deviation, $$X(u, \sigma) = x(u) * g(u, \sigma) = \int_{-\infty}^{\infty} x(v) \cdot \frac{1}{\sigma\sqrt{2\pi}} \cdot \exp\left(\frac{-(u-v)^2}{2\sigma^2}\right) dv,$$

$X_u(u,\sigma) = x(u) * g_u(u,\sigma)$, $X_{uu}(u,\sigma) = x(u) * g_{uu}(u,\sigma)$, $Y_u(u,\sigma) = y(u) * g_u(u,\sigma)$, $Y_{uu}(u,\sigma) = y(u) * g_{uu}(u,\sigma)$, $$g_u(u, \sigma) = \frac{\partial}{\partial u} g(u, \sigma), \text{ and } g_{uu}(u, \sigma) = \frac{\partial^2}{\partial u^2} g(u, \sigma); \text{ and}$$

(C3) utilizing different standard deviations σ to find a location having zero curvature in $\Gamma_\sigma$, and continuously drawing all locations having zero curvature under different standard deviations σ.

3. The method as claimed in claim 2, wherein the normalized arc length parameter u has a value between 0 and 1.

4. The method as claimed in claim 2, wherein in step (C2), the operation performed with respect to the closed curve Γ and the Gauss function g(u,σ) is a convolution operation.

5. The method as claimed in claim 2, wherein in step (C2), the Gauss function is:

$$g(u, \sigma) = \frac{1}{\sigma\sqrt{2\pi}} \cdot \exp\left(\frac{-u^2}{2\sigma^2}\right).$$

6. The method as claimed in claim 2, wherein in step (C3), in the u–σ coordinate, a position of κ(u,σ)=0 is defined as the zero curvature point.

7. The method as claimed in claim 1, wherein in step (D), the feature parameter $F_{C_k}^S$ of a predetermined reference gesture shape represented as a basis point of the maximal peak is expressed as $F_{C_k}^S = \{\{(u_{j,C_k}^S, \sigma_{j,C_k}^S)\}_{j=1,\ldots,M^{1-Normalized}}\}$, $1 \leq k \leq \kappa$, where κ is the number of the types of the reference gesture shapes stored in the database, $C_k$ is a type represented by the reference gesture shape, M is the number of the peaks of the reference gesture shape, and S is the reference gesture shape.

8. The method as claimed in claim 7, wherein step (E) comprises the steps of:

(E1) comparing each feature parameter $F^I$ of T sets of the gesture image with each feature parameter $F_{C_k}^S$ of the reference gesture shapes, where $1 \leq k \leq \kappa$ for obtaining a plurality of sets of matched values $MATCH_{t1}$ defined as a sum of a distance of the matched peaks and a distance of the unmatched peaks between two sets of feature parameters, and expressed as:

$$MATCH_{t1} = \sum_{\substack{matched \\ peaks}} \sqrt{(u_i^I - u_{j,C_k}^S)^2 + (\sigma_i^I - \sigma_{j,C_k}^S)^2} + \sum_{\substack{unmatched \\ peaks}} \sigma_i^I + \sum_{\substack{unmatched \\ peaks}} \sigma_{j,C_k}^S;$$

(E2) determining a similarity between the feature parameter $F^I$ of the gesture image and the feature parameter $F_{C_k}^S$ of the reference gesture shapes by performing a distance function:

$\text{dist}(F^I, F_{C_k}^S) = \min\{MATCH_{t1}\}$; and (E3) utilizing a decision function:

$D(F^I) = C_j$ if $\text{dist}(F^I, F_{C_j}^S) = \min\limits_{1 \leq k \leq K} \{\text{dist}(F^I, F_{C_k}^S)\}$ to determine a reference gesture shape of the gesture image.

9. The method as claimed in claim 8, wherein in step (E3), a nearest neighbor algorithm is utilized to recognize a gesture for finding the nearest reference gesture shape with respect to the gesture image for determining a gesture shape corresponding to the gesture image.

* * * * *